United States Patent
Tomofuji

(10) Patent No.: US 12,457,131 B2
(45) Date of Patent: Oct. 28, 2025

(54) ELECTRONIC APPARATUS

(71) Applicant: KYOCERA Document Solutions Inc., Osaka (JP)

(72) Inventor: Shinji Tomofuji, Osaka (JP)

(73) Assignee: Kyocera Document Solutions, Inc. (JP)

( * ) Notice: Subject to any disclaimer, the term of this patent is extended or adjusted under 35 U.S.C. 154(b) by 381 days.

(21) Appl. No.: 18/043,953

(22) PCT Filed: Aug. 31, 2021

(86) PCT No.: PCT/JP2021/031933
§ 371 (c)(1),
(2) Date: Mar. 3, 2023

(87) PCT Pub. No.: WO2022/050272
PCT Pub. Date: Mar. 10, 2022

(65) Prior Publication Data
US 2023/0327911 A1   Oct. 12, 2023

(30) Foreign Application Priority Data
Sep. 7, 2020 (JP) ................. 2020-149677

(51) Int. Cl.
*H04L 12/26* (2006.01)
*H04L 12/10* (2006.01)
*H04L 12/46* (2006.01)

(52) U.S. Cl.
CPC .......... *H04L 12/4625* (2013.01); *H04L 12/10* (2013.01)

(58) Field of Classification Search
USPC ................. 370/252, 395, 400, 393
See application file for complete search history.

(56) References Cited

U.S. PATENT DOCUMENTS

| | | | |
|---|---|---|---|
| 2005/0276269 A1* | 12/2005 | Kim | G06F 1/3287 370/395.2 |
| 2014/0085655 A1* | 3/2014 | Matsubara | H04N 1/00896 358/1.13 |
| 2017/0257504 A1* | 9/2017 | Yamada | H04N 1/00891 |
| 2019/0191018 A1* | 6/2019 | Sasadai | H04L 12/4625 |
| 2019/0332339 A1* | 10/2019 | Nakai | G06F 3/1238 |

FOREIGN PATENT DOCUMENTS

JP    2011-123738    6/2011

* cited by examiner

*Primary Examiner* — Zewdu A Beyen

(57) ABSTRACT

An upperlimit communication speed of a power-saving wired LAN circuit 13 is lower than an upperlimit communication speed of a high-speed wired LAN circuit 12, and power consumption of the power-saving wired LAN circuit 13 is smaller than power consumption of the high-speed wired LAN circuit 12. Further, when the electronic apparatus 1 moves to a suspended status, the wired LAN management unit 16b switches a wired LAN circuit used for wired LAN communication from the high-speed wired LAN circuit 12 to the power-saving wired LAN circuit 13.

3 Claims, 3 Drawing Sheets

ELECTRONIC APPARATUS

TECHNICAL FIELD

The present invention relates to an electronic apparatus.

BACKGROUND ART

A terminal device has a network connecting function, and when moving to a power saving status, the terminal device sets a communication speed as a lowest communication speed that can be set in its physical layer device (for example, see PATENT LITERATURE #1).

CITATION LIST

Patent Literature

PATENT LITERATURE #1: Japan Patent Application Publication No. 2011-123738.

SUMMARY OF INVENTION

Technical Problem

Recently, a communication speed of a wired LAN (Local Area Network) gets higher, but also such higher communication speed results in more power consumption in a wired LAN circuit.

For a wired LAN circuit, although there is a power saving technique of an idle status such as Energy Efficient Ethernet standardized in IEE802.3az, for example, even when a wired LAN circuit having a high upperlimit communication speed (e.g. 10 Gbps) is limited to a low communication speed, its power consumption is larger than power consumption of a wired LAN circuit having a low upperlimit communication speed.

The present invention has been conceived in view of the aforementioned problem, and it is an object of the present invention to obtain an electronic apparatus that operates with small power consumption in a suspended status.

Solution to Problem

An electronic apparatus according to the present invention includes a first wired LAN circuit, a second wired LAN circuit, and a wired LAN management unit configured to switch a wired LAN circuit used for wired LAN communication from one to the other among the first and second wired LAN circuits. An upperlimit communication speed of the first wired LAN circuit is a predetermined first value, an upperlimit communication speed of the second wired LAN circuit is a predetermined second value, and the second value is smaller than the first value; and power consumption of the second wired LAN circuit is smaller than power consumption of the first wired LAN circuit. Further, when the electronic apparatus moves to a suspended status, the wired LAN management unit switches a wired LAN circuit used for wired LAN communication from the first wired LAN circuit to the second wired LAN circuit.

Advantageous Effect of Invention

By means of the present invention, obtained is an electronic apparatus that operates with small power consumption in a suspended status.

These and other objects, features and advantages of the present invention will become more apparent upon reading of the following detailed description along with the accompanied drawings.

DESCRIPTION OF EMBODIMENTS

Hereinafter, an embodiment according to aspects of the present invention will be explained with reference to a drawing.

Figure 1:
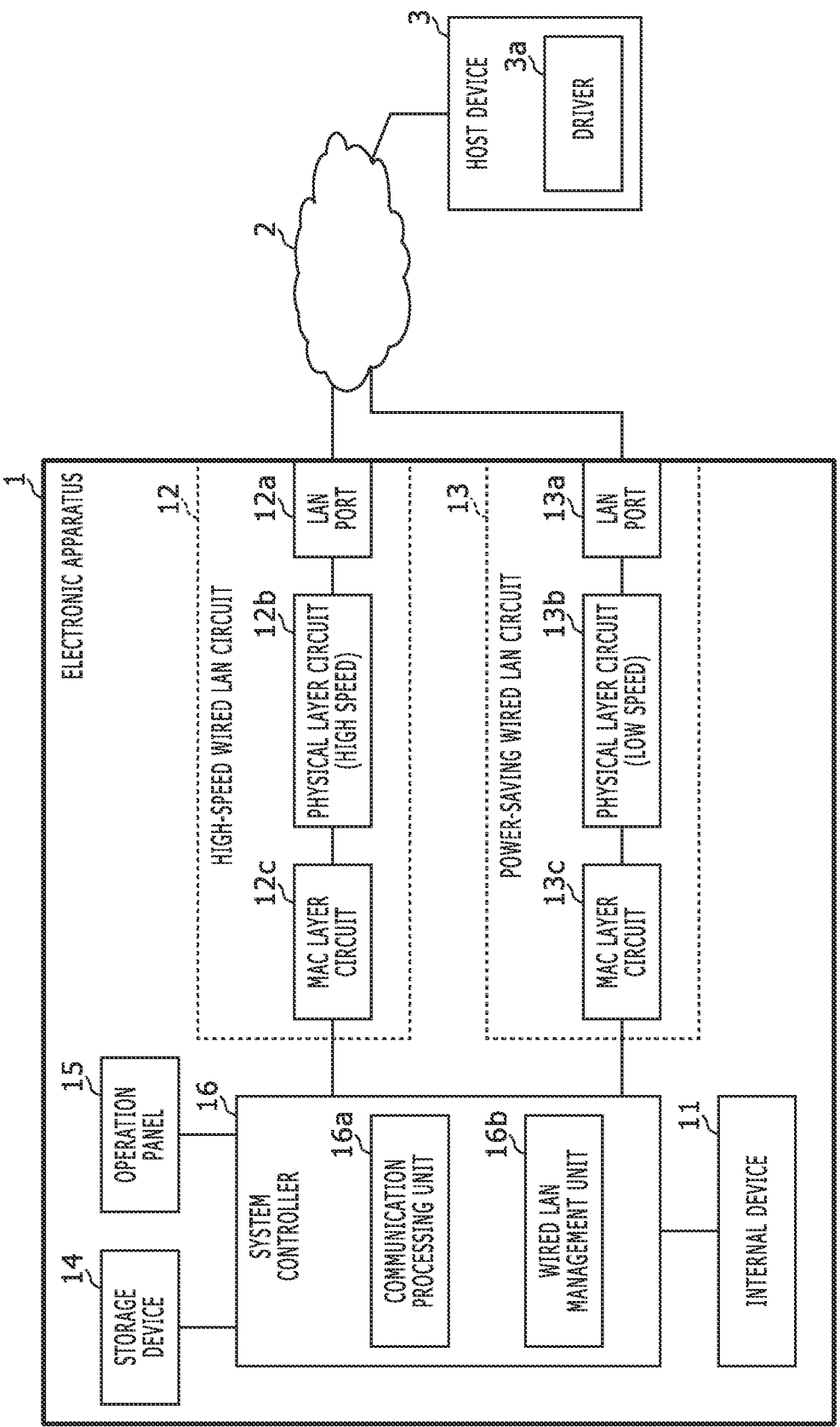
FIG. 1 shows a block diagram that indicates a configuration of an electronic apparatus according to an embodiment of the present invention.

FIG. 1 shows a block diagram that indicates a configuration of an electronic apparatus according to an embodiment of the present invention.

The electronic apparatus 1 shown in FIG. 1 includes an internal device 11 that has a predetermined function, and using the internal device 11, performs a process corresponding to a request received from a host device 3 through a network 2. In this embodiment, the electronic apparatus 1 is an image forming apparatus such as printer, scanner, or multi function peripheral, and the internal device 11 is a printing device that prints a requested image onto a print sheet, an image scanning device that optically scans a document image from a document and generates image data of the scanned document image, and/or the like. The host device 3 such as personal computer is a terminal device having a network function, in which a driver 3a for the electronic apparatus 1 is installed.

Further, the electronic apparatus 1 includes a high-speed wired LAN circuit 12, a power-saving wired LAN circuit 13, a storage device 14, an operation panel 15, and a system controller 16.

The high-speed wired LAN circuit 12 is a network interface circuit capable of connecting to the network in a wired manner, and includes a LAN port 12a to which a LAN cable can be connected, a physical layer circuit 12b, and a MAC layer circuit 12c. The physical layer circuit 12b and the MAC layer circuit 12c are installed such as SoC (System on a chip), for example.

The power-saving wired LAN circuit 13 is a network interface circuit capable of connecting to the network in a wired manner, and includes a LAN port 13a to which a LAN cable can be connected, a physical layer circuit 13b, and a MAC layer circuit 13c. The physical layer circuit 13b and the MAC layer circuit 13c are installed such as SoC, for example.

The physical layer circuits 12b and 13b are circuits having a communication function of the lowest layer (physical layer) in OSI layer model, and an upperlimit communication speed of the physical layer circuit 13b is lower than an upperlimit communication speed of the physical layer circuit 12b. The MAC layer circuits 12c and 13c are circuits having a communication function (media access control function and the like) of the second layer (data link layer) in OSI layer model.

Specifically, an upperlimit communication speed of the high-speed wired LAN circuit 12 (specifically, an upperlimit communication speed of its physical layer) is a predetermined first value (e.g. 10 Gbps), an upperlimit communication speed of the power-saving wired LAN circuit 13 (specifically, an upperlimit communication speed of its physical layer) is a predetermined second value (e.g. 100 Mbps), and the second value is smaller than the first value. Further, power consumption of the power-saving wired LAN circuit 13 is smaller than power consumption of the high-speed wired LAN circuit 12. At least in an idle status, power consumption of the power-saving wired LAN circuit 13 is smaller than power consumption of the high-speed wired LAN circuit 12.

The storage device 14 is a non-volatile storage device such as flash memory.

The operation panel 15 is arranged on a housing of the electronic apparatus 1, and includes a display device such as liquid crystal display and/or indicator that displays sorts of information to a user and an input device such as touch panel and/or hard key that receives a user operation.

The system controller 16 includes a processor (computer) such as CPU (Central Processing Unit), and executes a program stored in the storage device 14 or the like using the processor, and thereby controls the internal device 11 or the like and acts as sorts of processing units in accordance with a user operation to the operation panel 15 and/or a request from the host device 3 (the driver 3a). Here, the system controller 16 acts as a communication processing unit 16a and a wired LAN management unit 16b.

The communication processing unit 16a has communication functions of the third layer and higher in OSI layer model, and performs data communication (reception of a request, transmission of a notification and/or a processing result, and the like) with the host device or the like using the wired LAN circuits 12 and 13.

The wired LAN management unit 16b switches a wired LAN circuit used for wired LAN communication from one to the other among the high-speed wired LAN circuit 12 and the power-saving wired LAN circuit 13.

In particular, when an operation status of the electronic apparatus 1 changes from a ready status to a suspended status, the wired LAN management unit 16b switches a wired LAN circuit used for wired LAN communication from the high-speed wired LAN circuit 12 to the power-saving wired LAN circuit 13.

Specifically, when the electronic apparatus 1 moves from the ready status to the suspended status, the wired LAN management unit 16b (a) powers-on the power-saving wired LAN circuit 13, (b) transmits an address switching notification to the specific host device 3 through the network 2 using the high-speed wired LAN circuit 12, and (c) powers-off the high-speed wired LAN circuit 12. Here, the address switching notification causes to switch an IP (Internet Protocol) address of the electronic apparatus 1 from an IP address of the high-speed wired LAN circuit 12 to an IP address of the power-saving wired LAN circuit 13.

A destination of the address switching notification may be set as a network identification (IP address or the like) of a host device 3 in communication (i.e. a host device 3 with which a communication session is established); and alternatively, the communication processing unit 16a or the wired LAN management unit 16b may store as a communication history network identifications of host devices 3 with which communication have been performed, and the wired LAN management unit 16b may set the destination of the address switching notification as a network identification included in the communication history.

Further, in this embodiment, after a response to the address switching notification is received from the specific host device 3 by the high-speed wired LAN circuit 12 or the power-saving wired LAN circuit 13, the wired LAN management unit 16b powers-off the high-speed wired LAN circuit 12.

Furthermore, in this embodiment, the wired LAN circuits 12 and 13 include the MAC layer circuits 12c and 13c, respectively, as mentioned; and after the power-saving wired LAN circuit 13 is powered-on, the wired LAN management unit 16b (a) acquires an IP address (dynamic IP address) of the power-saving wired LAN circuit 13 using DHCP (Dynamic Host Configuration Protocol), and (b) transmits the address switching notification to the specific host device 3 using the high-speed wired LAN circuit 12 after a relationship between the IP address and a MAC (Media Access Control) address of the power-saving wired LAN circuit 13 (the MAC layer circuit 13c) is registered into an ARP (Address Resolution Protocol) table in a communication counterpart (specifically, a router and the host device 3) in the network.

It should be noted that when an operation status of the electronic apparatus 1 changes from the suspended status to the ready status, the wired LAN management unit 16b switches a wired LAN circuit used for wired LAN communication from the power-saving wired LAN circuit 13 to the high-speed wired LAN circuit 12 in the same manner.

Figure 2:
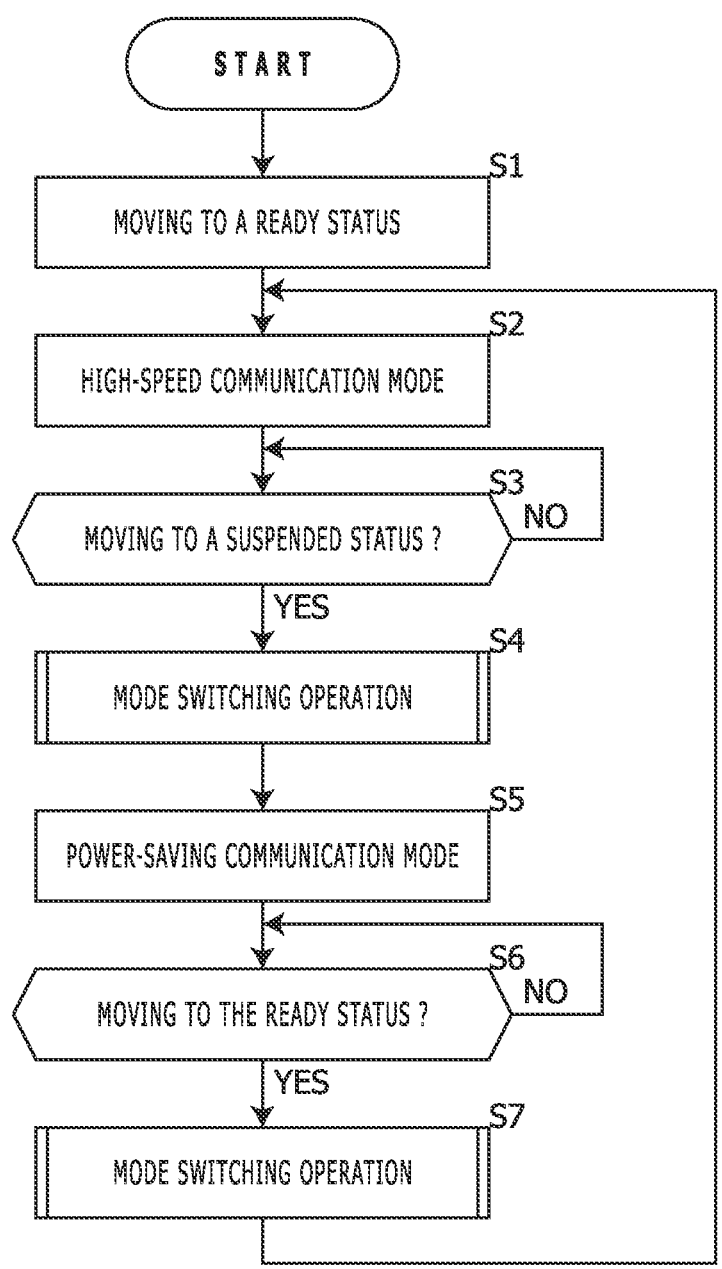
FIG. 2 shows a flowchart that explains a behavior of the electronic apparatus shown in FIG. 1.

The following part explains the aforementioned electronic apparatus 1. FIG. 2 shows a flowchart that explains a behavior of the electronic apparatus shown in FIG. 1.

When the electronic apparatus 1 starts, the system controller 16 firstly moves an operation status of the electronic apparatus 1 to a ready status (i.e. a status in which a function using the internal device 11 can be immediately used) (in Step S1). In the ready status, the wired LAN management unit 16b sets the high-speed wired LAN circuit 12 as a wired LAN circuit used for wired LAN communication through the network 2, and the communication processing unit 16a selects a high-speed communication mode and performs wired LAN communication using the high-speed wired LAN circuit 12 (in Step S2). In the high-speed communication mode, the high-speed wired LAN circuit 12 is powered-on, the power-saving wired LAN circuit 13 is powered-off, and the high-speed wired LAN circuit 12 acquires the IP address using DHCP, for example, and links up the network 2.

In this status, when the driver 3a of the host device 3 transmits a request, for example, the driver 3a performs broadcast transmission of an inquiry with a specific port number for the electronic apparatus 1 in TCP (Transmission Control Protocol), acquires the IP address of the electronic apparatus 1 on the basis of a response from the electronic apparatus 1, and transmits the request to the acquired IP address.

Afterward, if a non-operation period exceeds a predetermined time, if a pre-scheduled time comes, or the like, then the system controller 16 switches an operation status of the electronic apparatus 1 from the ready status to a suspended status (i.e. a status in which a predetermined part such as the internal device 11 is powered-off but reception of a request or the like is enabled in the system controller 16).

Upon detecting the movement to the suspended status (in Step S3), the wired LAN management unit 16b performs a mode switching operation (in Step S4), and the communication processing unit 16a selects a power-saving communication mode and performs wired LAN communication using the power-saving wired LAN circuit 13 (in Step S5).

Further, in the suspended status, if a user operation is detected, if a pre-scheduled time comes, or the like, then the system controller 16 switches an operation status of the electronic apparatus 1 from the suspended status to the ready status.

Upon detecting the movement to the ready status (in Step S6), the wired LAN management unit 16b performs a mode switching operation (in Step S7), and the communication processing unit 16a selects a high-speed communication mode and performs wired LAN communication using the high-speed wired LAN circuit 12 (in Step S2).

As mentioned, in accordance with an operation status of the electronic apparatus 1, only one of the wired LAN circuits 12 and 13 is powered-on and used for network communication.

Figure 3:
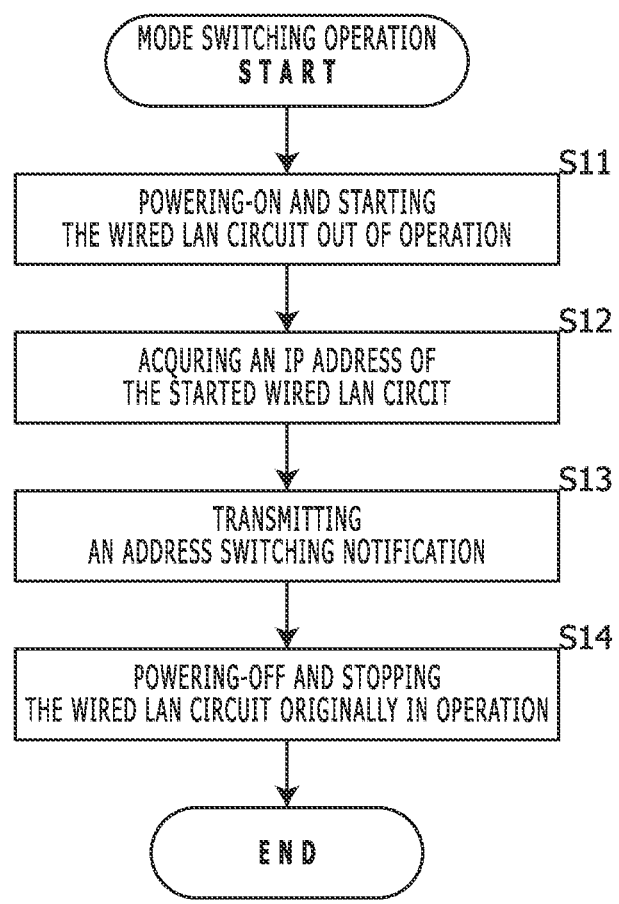
FIG. 3 shows a flowchart that explains a mode switching operation (Steps S4 and S7) in FIG. 2.

Here, the following part explains the mode switching operation (Steps S4 and S7). FIG. 3 shows a flowchart that explains a mode switching operation (Steps S4 and S7) in FIG. 2.

The wired LAN management unit 16b powers-on and starts a suspended wired LAN circuit (in Step S4, the power-saving wired LAN circuit 13, and in Step S7, the high-speed wired LAN circuit 12) (in Step S11).

The wired LAN management unit 16b acquires an IP address of the started wired LAN circuit, and links up the network 2 (in Step S12).

Afterward, the wired LAN management unit 16b transmits the address switching notification to the host device 3 using an originally operating wired LAN circuit (in Step S4, the high-speed wired LAN circuit 12, and in Step S7, the power-saving wired LAN circuit 13) (in Step S13).

At this time point, both of the high-speed wired LAN circuit 12 and the power-saving wired LAN circuit 13 are capable of wired LAN communication.

Upon receiving the address switching notification, the driver 3a of the host device 3 renews an IP address stored of the electronic apparatus 1 (i.e. an IP address associated with a port number for the electronic apparatus 1) with an IP address specified by the address switching notification. Upon receiving the address switching notification or upon the renewal of the IP address, the driver 3a of the host device 3 immediately transmits a response to the address switching notification (acknowledgement or the like) to the electronic apparatus 1 (to the IP address before the renewal or the IP address after the renewal).

Further, upon receiving the response using one of the wired LAN circuits, the wired LAN management unit 16b powers-off an originally operating wired LAN circuit (in Step S4, the high-speed wired LAN circuit 12, and in Step S7, the power-saving wired LAN circuit 13) and thereby suspends this wired LAN circuit (in Step S14).

As mentioned, in the aforementioned embodiment, an upperlimit communication speed of a power-saving wired LAN circuit 13 is lower than an upperlimit communication speed of a high-speed wired LAN circuit 12, and power consumption of the power-saving wired LAN circuit 13 is smaller than power consumption of the high-speed wired LAN circuit 12. Further, when the electronic apparatus 1 moves to a suspended status, the wired LAN management unit 16b switches a wired LAN circuit used for wired LAN communication from the high-speed wired LAN circuit 12 to the power-saving wired LAN circuit 13.

Consequently, compared with operating the high-speed wired LAN circuit 12 at a low speed, an operation such as network communication is performed with low power consumption in the suspended status.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, rather than dynamic IP addresses, static IP addresses may be assigned to the wired LAN circuits 12 and 13, and these static IP addresses may be pre-registered in the driver 3a.

INDUSTRIAL APPLICABILITY

For example, the present invention is applicable to an image forming apparatus.

The invention claimed is:

1. An electronic apparatus, comprising:
   a first wired LAN circuit;
   a second wired LAN circuit;
   a wired LAN management unit configured to switch a wired LAN circuit used for wired LAN communication from one to the other among the first and second wired LAN circuits;
   wherein an upperlimit communication speed of the first wired LAN circuit is a predetermined first value, an upperlimit communication speed of the second wired LAN circuit is a predetermined second value, and the second value is smaller than the first value;
   power consumption of the second wired LAN circuit is smaller than power consumption of the first wired LAN circuit; and
   when the electronic apparatus moves to a suspended status, the wired LAN management unit switches a wired LAN circuit used for wired LAN communication from the first wired LAN circuit to the second wired LAN circuit and the wired LAN management unit (a) powers-on the second wired LAN circuit, (b) transmits an address switching notification to a specific host device through a network using the first wired LAN circuit, the address switching notification causing to switch an IP address of the electronic apparatus from an IP address of the first wired LAN circuit to an IP address of the second wired LAN circuit, and (c) powers-off the first wired LAN circuit.

2. The electronic apparatus according to claim 1, wherein after a response to the address switching notification is received from the specific host device by the first wired LAN circuit or the second wired LAN circuit, the wired LAN management unit powers-off the first wired LAN circuit.

3. An electronic apparatus, comprising:
   a first wired LAN circuit;
   a second wired LAN circuit; and
   a wired LAN management unit configured to switch a wired LAN circuit used for wired LAN communication from one to the other among the first and second wired LAN circuits;
   wherein an upperlimit communication speed of the first wired LAN circuit is a predetermined first value, an upperlimit communication speed of the second wired LAN circuit is a predetermined second value, and the second value is smaller than the first value;
   power consumption of the second wired LAN circuit is smaller than power consumption of the first wired LAN circuit; and
   when the electronic apparatus moves to a suspended status, the wired LAN management unit switches a wired LAN circuit used for wired LAN communication from the first wired LAN circuit to the second wired LAN circuit; and wherein the first and second wired LAN circuits comprise MAC layer circuits, respectively, and after the second wired LAN circuit is powered-on, the wired LAN management unit (a) acquires an IP address of the second wired LAN circuit, and (b) transmits the address switching notification to the specific host device using the first wired LAN circuit after a relationship between the IP address and a MAC address of the second wired LAN circuit is registered into an ARP table in a communication counterpart in the network.

* * * * *